United States Patent
Yamagishi et al.

(10) Patent No.: US 6,726,109 B2
(45) Date of Patent: Apr. 27, 2004

(54) PASSPORT WITH ANTI-COUNTERFEIT ID CHIP

(75) Inventors: Norikazu Yamagishi, Yokohama (JP); Mutsuharu Takesada, Yokohama (JP); Takaaki Habara, Yokohama (JP); Mina Imai, Yokohama (JP)

(73) Assignee: Hitachi Electronic Service Co. Ltd., Yokohama (JP)

( * ) Notice: Subject to any disclaimer, the term of this patent is extended or adjusted under 35 U.S.C. 154(b) by 0 days.

(21) Appl. No.: 10/279,136

(22) Filed: Oct. 23, 2002

(65) Prior Publication Data

US 2003/0136850 A1 Jul. 24, 2003

(30) Foreign Application Priority Data

Jan. 21, 2002 (JP) ........................................ 2002-011216

(51) Int. Cl.$^7$ ................................................ G06K 19/06
(52) U.S. Cl. ........................ 235/492; 235/375; 235/382; 235/355
(58) Field of Search ................................. 235/492, 375, 235/382, 385

(56) References Cited

U.S. PATENT DOCUMENTS

| | | | | | |
|---|---|---|---|---|---|
| 5,211,424 A | * | 5/1993 | Bliss | .......................... | 281/15.1 |
| 5,774,168 A | * | 6/1998 | Blome | .......................... | 347/262 |
| 6,111,506 A | * | 8/2000 | Yap et al. | .................. | 340/572.1 |
| 6,483,920 B2 | * | 11/2002 | Pinkas | ........................ | 380/286 |
| 2003/0057286 A1 | * | 3/2003 | Yamagishi et al. | ......... | 235/492 |
| 2003/0135731 A1 | * | 7/2003 | Barkan et al. | .............. | 713/155 |
| 2003/0136828 A1 | * | 7/2003 | Takesada et al. | ........... | 235/380 |
| 2003/0136851 A1 | * | 7/2003 | Habara et al. | .............. | 235/492 |

FOREIGN PATENT DOCUMENTS

| | | | | |
|---|---|---|---|---|
| JP | 410157352 A | * | 6/1998 | .......... G06K/19/10 |
| JP | 11-198573 | | 7/1999 | |

* cited by examiner

Primary Examiner—Thien M. Le
Assistant Examiner—Allyson Sanders
(74) Attorney, Agent, or Firm—Fildes & Outland, P.C.

(57) ABSTRACT

A passport 1 with an anti-counterfeit ID chip that certifies the identity and the nationality of a passport holder entering and departing a country comprises a passport body 3 having printed thereto a photograph 2 for identifying the passport owner. A particle-like micro ID chip storing at least an identification photograph information of the passport owner comparable with the identification photograph 2 printed on the passport body 3 is embedded in the passport body. Whether a passport is counterfeited or not is judged by comparing the identification photograph 2 printed on the passport body 3 with the photograph information of the passport owner read out from the ID chip 4 and displayed on a screen.

2 Claims, 9 Drawing Sheets

PASSPORT WITH ANTI-COUNTERFEIT ID CHIP

FIELD OF THE INVENTION

The present invention relates to a passport having an anti-counterfeit ID chip embedded in the passport body, the ID chip storing a photograph (head shot) information of the passport owner so as to prevent counterfeit of the passport.

DESCRIPTION OF THE RELATED ART

In general, a passport is a document that certifies the identity and the nationality of the passport holder who is traveling to a foreign country or returning therefrom, and it further asks for protection of and requests for availability of facilities for the passport holder in a foreign country.

Those not in possession of a passport issued by the foreign minister or consul are prohibited from leaving a country or entering another country.

The conventional passport merely contains the passport owner's personal information, passport information, and a photograph and the like printed on the passport body for identifying the passport owner.

Japanese Patent Laid-Open Publication No. 11-198573 discloses a face photograph verification system which prevents the fraudulent use or forgery of the photograph on a passport or an identification card and the like.

Recently, however, the forging of passports have become cleverer, and in the case of Japan, the number of foreigners attempting to enter the country using cunningly forged passports has increased rapidly. Along with such trend, the number of crimes caused by illegal aliens residing within the country has also increased.

Currently, when a traveler travels to or returns from a foreign country, the traveler presents his/her passport at the embarkation/disembarkation check gate at the airport. The officer at the embarkation/disembarkation check gate simply visually confirms the information printed on the passport such as the personal information, the passport information and the photograph for identification, and judges whether the passport is a counterfeit passport or not. Accordingly, the check for forged passports performed by the officer at the check gate is not sufficient, and it is difficult for officers to clamp down on illegal immigrants etc. at the embarkation/disembarkation check gate of the airport.

Moreover, the face photograph verification system disclosed in Japanese Patent Laid-Open Publication No. 11-198573 teaches providing to a passport or identification card with face photographs a two-dimensional bar code representing the face photograph data, recreating the photograph data through a bar code reader, and comparing the face photograph shown on the screen and the face photograph printed on the passport or card for verification of the photograph.

SUMMARY OF THE INVENTION

The object of the present invention is to provide a passport with an anti-counterfeit ID chip, the ID chip having a size of a particle embedded in the passport body and recording the photograph information of the passport owner that can be compared with the identification photograph being printed on the passport body, the photograph information of the passport owner recorded in the ID chip capable of being displayed on a screen using a dedicated ID chip reader. According to the present invention, the officer at the embarkation/disembarkation check gate of an international airport can visually compare the identification photograph printed on the passport body with the photograph information of the passport owner read from the ID chip and displayed on the screen, thereby confirming that the passport holder is indeed the true passport owner. Moreover, the officer can determine whether the passport is forged or not by comparing the identification photograph printed on the passport body with the photograph information of the passport owner stored in the ID chip and displayed on the screen, thus strengthening the check on counterfeit passports at the embarkation/disembarkation check gate and thereby ensuring security. Therefore, the passport with an anti-counterfeit ID chip of the present invention enables officers to clamp down on illegal immigrants etc. at the check gate of the airport.

The passport with an anti-counterfeit ID chip according to the present invention for certifying the identity and nationality of a passport holder entering and departing a foreign country having an identification photograph printed thereto for confirming the passport owner comprises a passport body and a particle-like micro ID chip embedded in the passport body storing at least an identification photograph information comparable with said identification photograph printed on the passport body.

According to the present passport with an anti-counterfeit ID chip, the ID chip is embedded in a sheet of paper constituting the page on which the identification photograph of the passport owner is printed in the passport body.

According to the present passport with an anti-counterfeit ID chip, the ID chip is embedded in an appropriate position in a sheet of paper constituting the page on which the identification photograph of the passport owner is printed in the passport body.

According to the present passport with an anti-counterfeit ID chip, the ID chip is embedded in the photograph surface in a sheet of paper constituting the page on which the identification photograph of the passport owner is printed in the passport body.

According to another example of the present passport with an anti-counterfeit ID chip, the ID chip is embedded in a front cover, a back cover, or any appropriate sheet of paper constituting a page other than the page on which the identification photograph of the passport owner is printed in the passport body.

According to yet another example of the present passport with an anti-counterfeit ID chip, the number of ID chips embedded in the passport body is one or more than one.

DETAILED DESCRIPTION OF THE PREFERRED EMBODIMENT

We will now explain in detail the preferred embodiments of the present invention with reference to the accompanied drawings.

Figure 1:
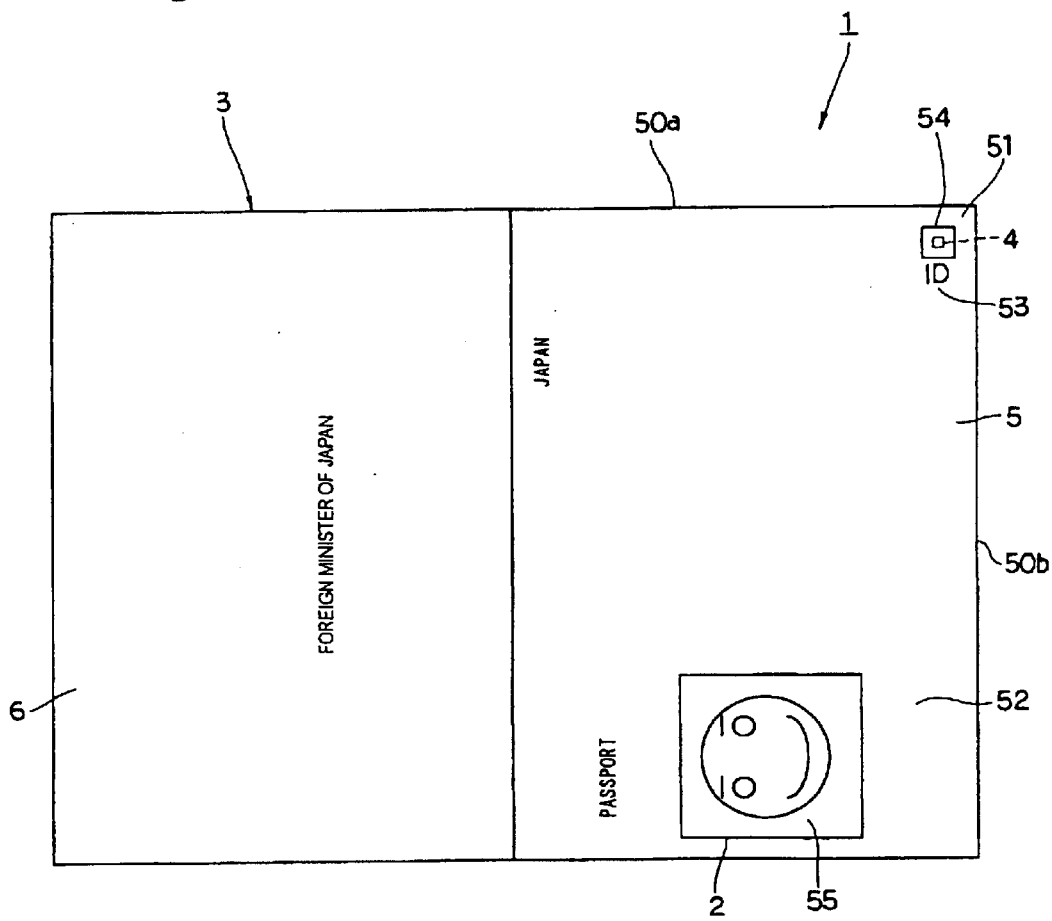
FIG. 1 is a front view of the passport with an anti-counterfeit ID chip according to embodiment 1 of the present invention in opened state.
Figure 2:
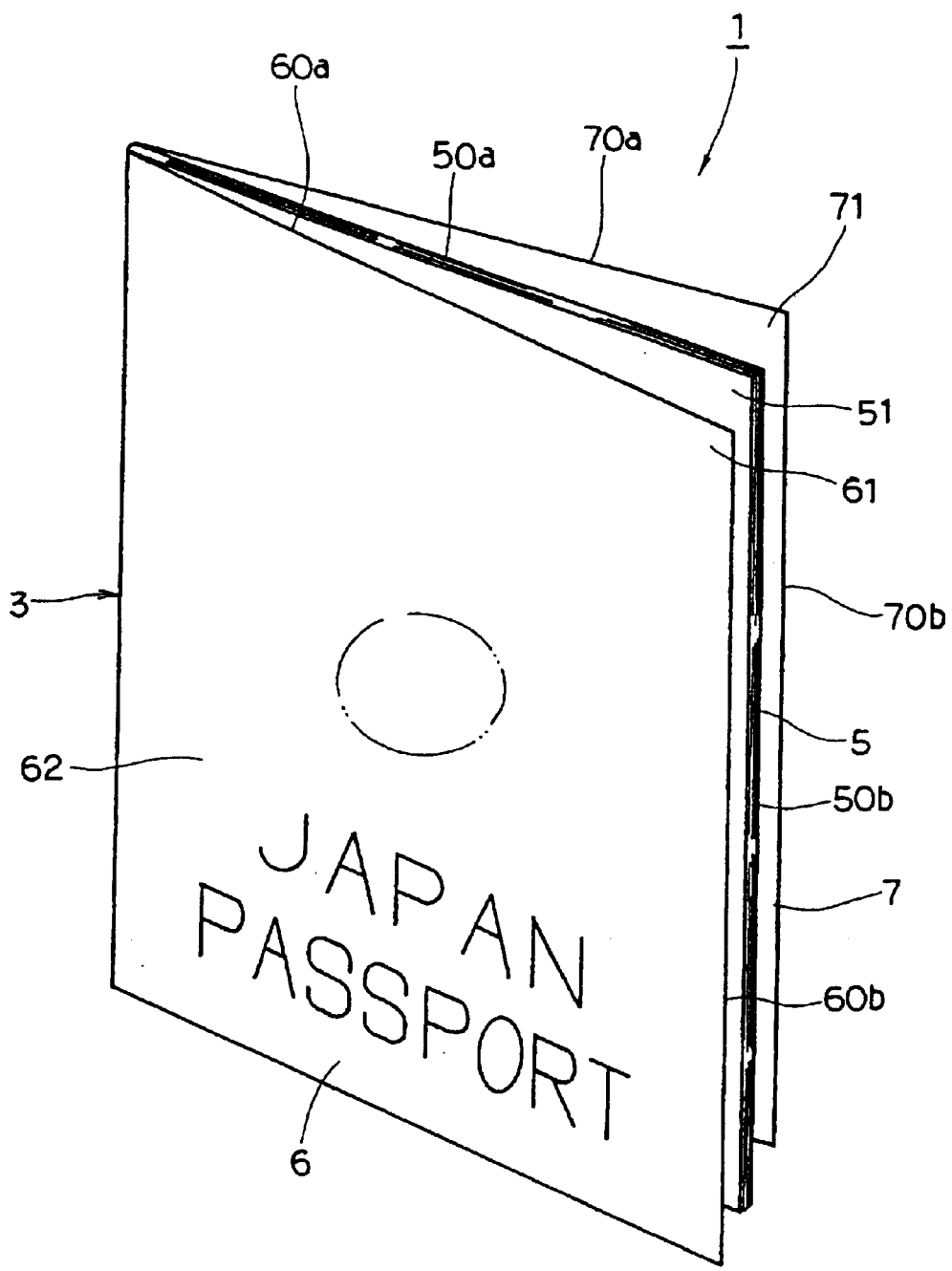
FIG. 2 is a perspective view showing the passport with an anti-counterfeit ID chip according to embodiment 1 of the present invention.

FIG. 1 is a front view showing the passport with an anti-counterfeit ID chip according to the first embodiment of the present invention, and FIG. 2 is a perspective view of the passport with an anti-counterfeit ID chip according to the first embodiment of the invention.

As illustrated in FIG. 1, the passport 1 with an anti-counterfeit ID chip according to the present invention comprises a passport body 3 having printed thereto a photograph 2 for identifying the passport holder, that certifies the identity and the nationality of a traveler traveling to a foreign country, and an ID chip 4 as small as a particle (particle-like micro ID chip) embedded in the passport body 3 recording at least a photograph information of the passport owner that can be compared with the identification photograph 2 printed on the body 3.

As shown in FIG. 2, the passport body 3 of the passport 1 with an anti-counterfeit ID chip comprises plural sheets of paper 5 of the same size, a front cover 6 and a back cover 7, which are assembled together to form a booklet.

As shown in FIG. 1, a single ID chip 4 is embedded in the sheet of paper 5 to which is printed the identification photograph 2, the chip being located at the corner portion 51 where the upper rim 50a and one side rim 50b meet.

Other than the photograph information on the passport owner, the ID chip 4 embedded in the passport body 3 of the passport with an anti-counterfeit ID chip 1 records passport ID information including the passport owner's nationality, name, sex, registered domicile, date of birth, height, current address, contact address, hair color and eye color, supplementary information, issue date of the passport, expiration date of the passport, passport number, and so on.

As shown in FIG. 1, on the front side surface 52 of the page 5 disposed between the front and back covers 6, 7 of the passport body 3 and having printed thereto the identification photograph 2 is further printed a mark 53 indicating that an ID chip 4 is embedded thereto.

Further, on the front side surface 52 of the page 5 disposed between the front and back covers 6, 7 and having printed thereto the identification photograph 2 is further printed a mark 54 indicating where the ID chip is embedded.

The ID chip 4 embedded in the passport body 3 is composed of a particle-like micro IC (integrated circuit) chip, the micro IC chip being capable of recording a number having 38 digits at maximum.

The size of the ID chip 4 is 0.4×0.4 mm with a thickness of 0.06 mm. Even if the passport 1 is bent, the embedded ID chip will not be damaged. The ID chip is equipped with a 128-bit ROM (read only memory).

The passport 1 with the anti-counterfeit ID chip of the present invention comprises the ID chip 4 embedded in the sheet of paper 5 of the page having printed thereto the identification photograph 2 of the passport owner.

The ID chip 4 of the passport 1 is embedded in an appropriate position on the sheet of paper 5 of the page having printed thereto the identification photograph 2 of the passport owner.

According to another aspect of the invention, the ID chip 4 of the passport 1 is embedded in the photograph surface 55 of the sheet of paper 5 of the page having printed thereto the identification photograph 2 of the passport owner.

According to yet another aspect of the invention, the ID chip 4 is embedded in the front cover 6 or the back cover 7, or any page other than the page on which the identification photograph 2 of the passport owner is printed.

The number of ID chips 4 embedded in the passport body 3 can be one or more than one.

Next, the method of using the passport 1 with the anti-counterfeit ID chip according to the present invention will be explained.

First, the passport applicant goes to the passport division of the local government organization of which the applicant is registered as resident, and follows the procedure for applying for a passport. The staff at the passport division reads in the image of the identification photograph of the passport applicant adhered to the application document using an image scanner, and records the photograph information of the passport applicant to the ID chip 4 embedded in the passport body 3. Then, the passport 1 with the anti-counterfeit ID chip having printed thereto the identification photograph 2 is issued and provided to the passport applicant.

A traveler traveling to a foreign country goes to an international airport from which his/her flight departs, taking with him/her the passport 1 with the anti-counterfeit ID chip, and presents the passport 1 at the embarkation/disembarkation check gate of the airport. The officer at the embarkation check gate of the airport reads out using a dedicated ID chip reader the identification photograph information on the passport applicant (=passport owner) from the ID chip 4 embedded in the sheet of paper 5 of the page on which the identification photograph 2 is printed in the passport body 3, and displays the photograph information of the passport owner on the screen of a display device. Then, the officer visually compares the identification photograph 2 printed on the passport body 3 with the photograph information of the passport owner read out from the ID chip 4 and displayed on the screen, and confirms that the passport owner and the passport holder are actually the same person. Thus, the officer can judge whether the passport is a forged passport or not by comparing the identification photograph printed on the passport body 3 with the photograph information of the passport owner read from the ID chip 4, enabling forged passports to be securely checked at the embarkation/disembarkation check gate of the airport ensuring improved security, and enabling illegal immigrants etc. to be cracked down on at the check gate.

Moreover, the officer at the embarkation/disembarkation check gate of the airport can check through visual observation whether the passport holder is the true owner of the passport by confirming the information printed on the passport body such as the personal information, the passport information and the identification photograph of the passport owner.

Further, the officer at the embarkation check gate can use a dedicated ID chip reader to read using radio waves the passport ID information recorded in the ID chip 4 embedded in the page 5 having the identification photograph 2 printed thereto of the passport body 3, in order to display on a screen the passport ID information such as the passport owner's nationality, name, sex, registered domicile, date of birth, height, current address, contact address, hair color, eye color, supplementary information, purpose of travel, issue date of passport, expiration date of passport and passport registration number.

The officer at the embarkation/disembarkation check gate can further visually observe the passport ID information recorded in the ID chip 4 and displayed on the screen such as the passport owner's nationality, name, sex, registered domicile, date of birth, height, current address, contact address, hair color, eye color, supplementary information, issue date of passport, expiration date of passport and passport registration number, in order to judge whether the passport is counterfeited or not. According to the passport with the anti-counterfeit ID chip of the present invention, the officer at the check gate can check out counterfeit passports with high accuracy, and therefore can crack down securely on illegal entry and illegal departure at the check gate of the international airport.

Figure 3:
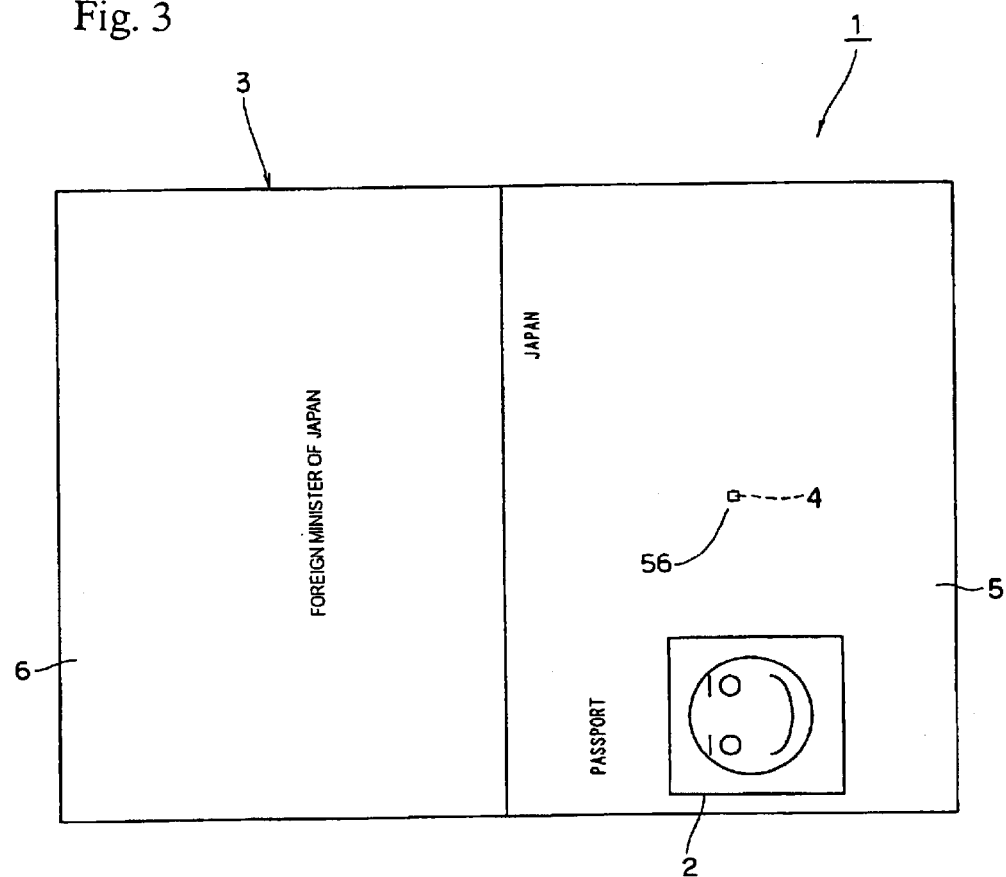
FIG. 3 is a front view showing the passport with an anti-counterfeit ID chip according to embodiment 2 of the present invention in opened state.

FIG. 3 is a front view illustrating the passport with an anti-counterfeit ID chip in opened state according to the second embodiment of the present invention.

An ID chip 4 storing the identification photograph information of the passport owner is embedded in the center area 56 of the sheet of paper 5 constituting the page on which the identification photograph 2 is printed in the passport body 3 of the passport 1 with the ID chip.

Figure 4:
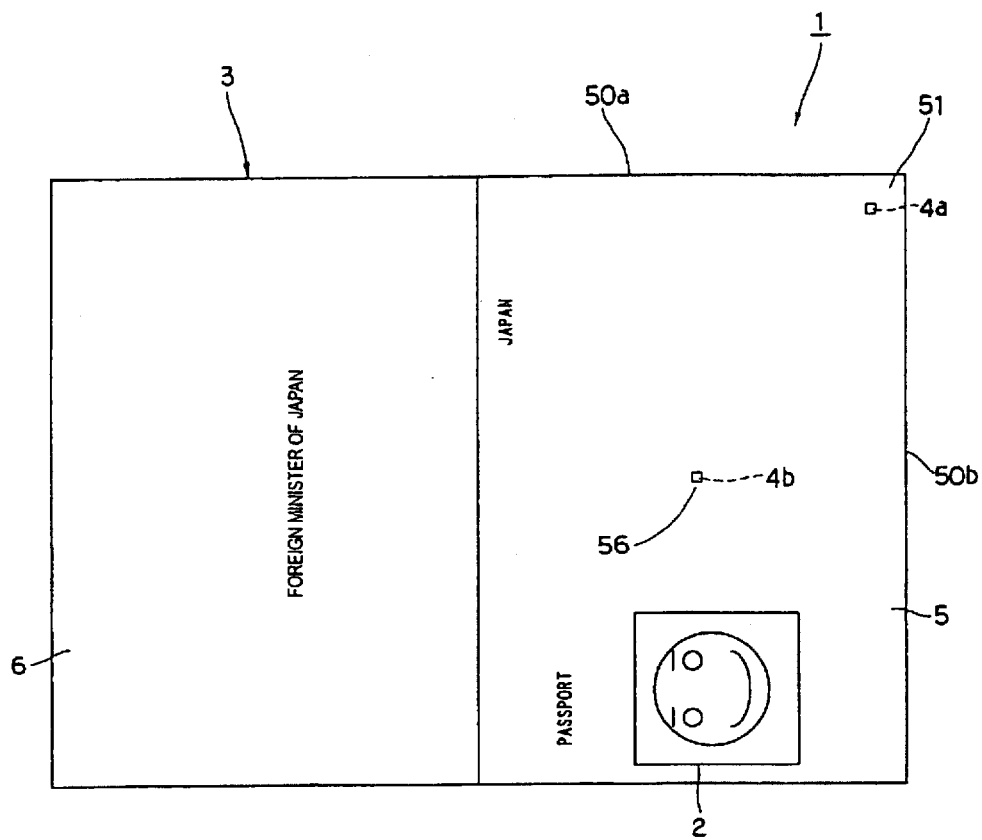
FIG. 4 is a front view showing the passport with an anti-counterfeit ID chip according to embodiment 3 of the present invention in opened state.

FIG. 4 is a front view illustrating the passport with an anti-counterfeit ID chip in opened state according to the third embodiment of the present invention.

As shown in FIG. 4, particle-like micro ID chips 4a and 4b storing the identification photograph information of the passport owner is embedded in the center area 56 and a corner area 51 where the upper rim 50a and one side rim 50b meet of the sheet of paper 5 constituting the page on which the identification photograph 2 is printed in the passport body 3 of the passport 1 with the ID chip.

Figure 5:
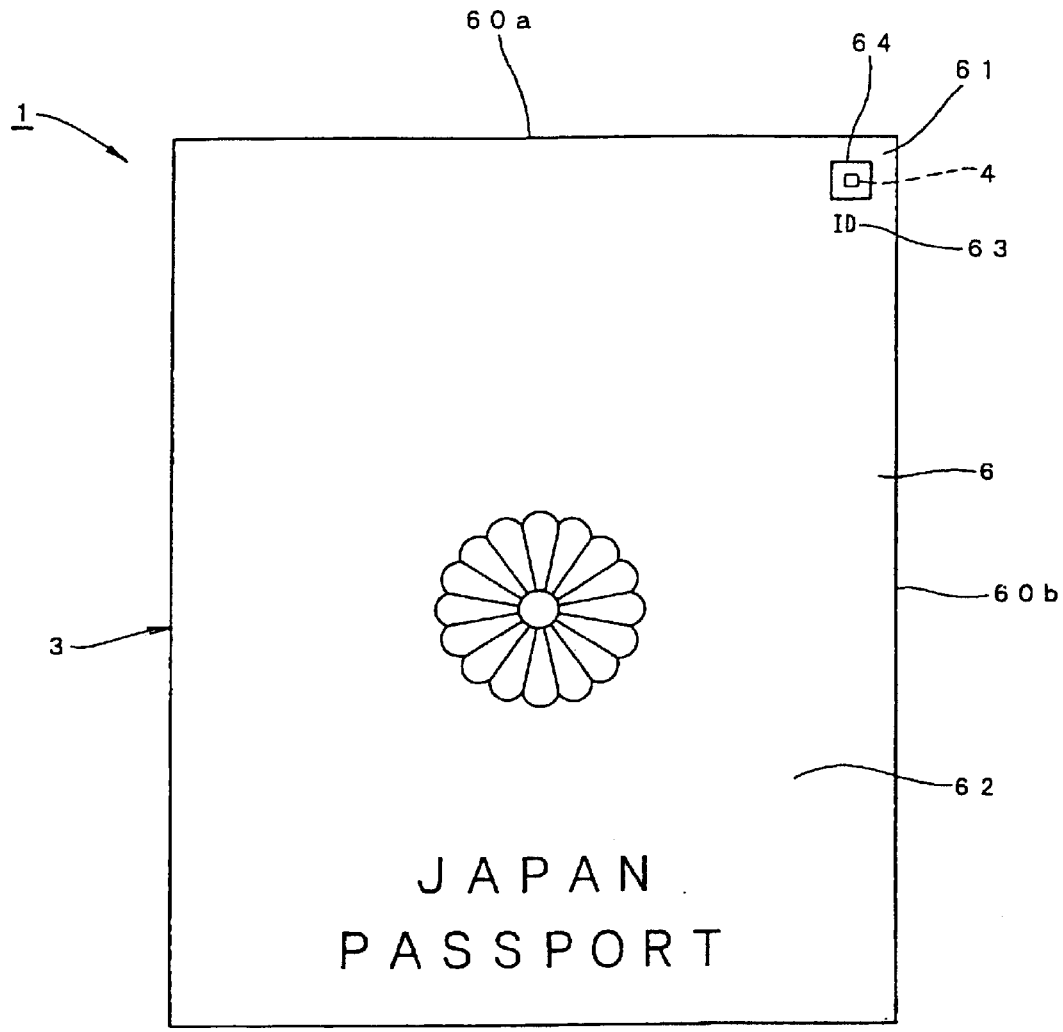
FIG. 5 is a front view showing the passport with an anti-counterfeit ID chip according to embodiment 4 of the present invention.

FIG. 5 is a front view illustrating the passport with an anti-counterfeit ID chip according to the fourth embodiment of the present invention.

As shown in FIG. 5, a particle-like micro ID chip 4 storing the identification photograph information of the passport owner is embedded in the corner area 61 where the upper rim 60a and one side rim 60b meet of a front cover 6 in the passport body 3 of the passport 1 with an anti-counterfeit ID chip.

As shown in FIG. 5, on the front surface 62 of the front cover 6 of the passport body 3 is printed a mark 63 indicating that an ID chip 4 is embedded therein.

Moreover, on the front surface 62 of the front cover 6 is printed a mark indicating where the ID chip 4 is embedded.

Figure 6:
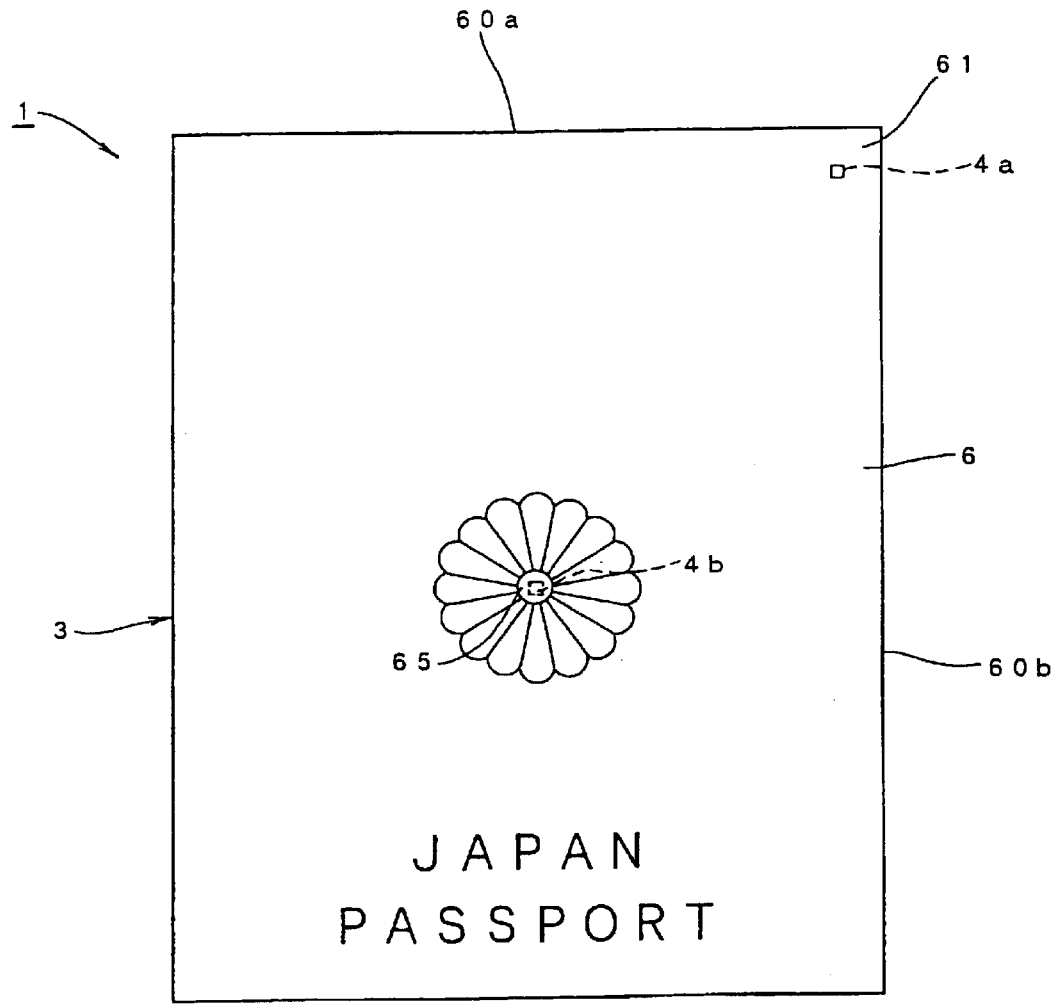
FIG. 6 is a front view showing the passport with an anti-counterfeit ID chip according to embodiment 5 of the present invention.

FIG. 6 is a front view showing the passport with the anti-counterfeit ID chip according to the fifth embodiment of the present invention.

Micro ID chips 4a and 4b storing the identification photograph information of the passport owner are embedded in the center area 65 and the corner area 61 where the upper rim 60a and one side rim 60b meet on the front cover 6 of the passport body 3.

Figure 7:
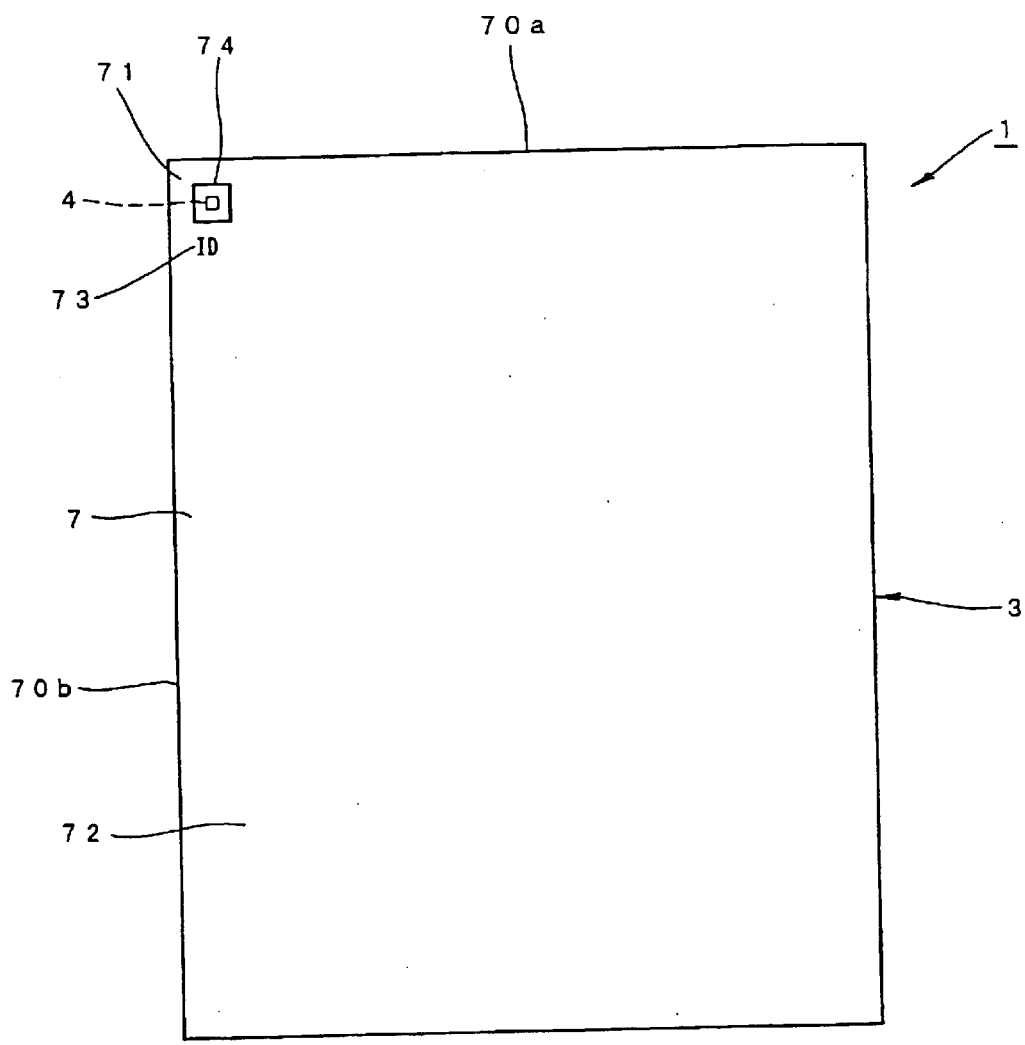
FIG. 7 is a back view showing the passport with an anti-counterfeit ID chip according to embodiment 6 of the present invention.

FIG. 7 is a back view showing the passport with the anti-counterfeit ID chip according to the sixth embodiment of the present invention.

One particle-like micro ID chip 4 storing the identification photograph information of the passport owner is embedded in the corner area 71 where the upper rim 70a and one side rim 70b meet on a back cover 7 of the passport body 3.

As shown in FIG. 7, on a back surface 72 of the back cover 7 of the passport body 3 is printed a mark 73 indicating that an ID chip 4 is embedded therein.

Moreover, on the back surface 72 of the back cover 7 is printed a mark indicating the location where the ID chip 4 is embedded.

Figure 8:
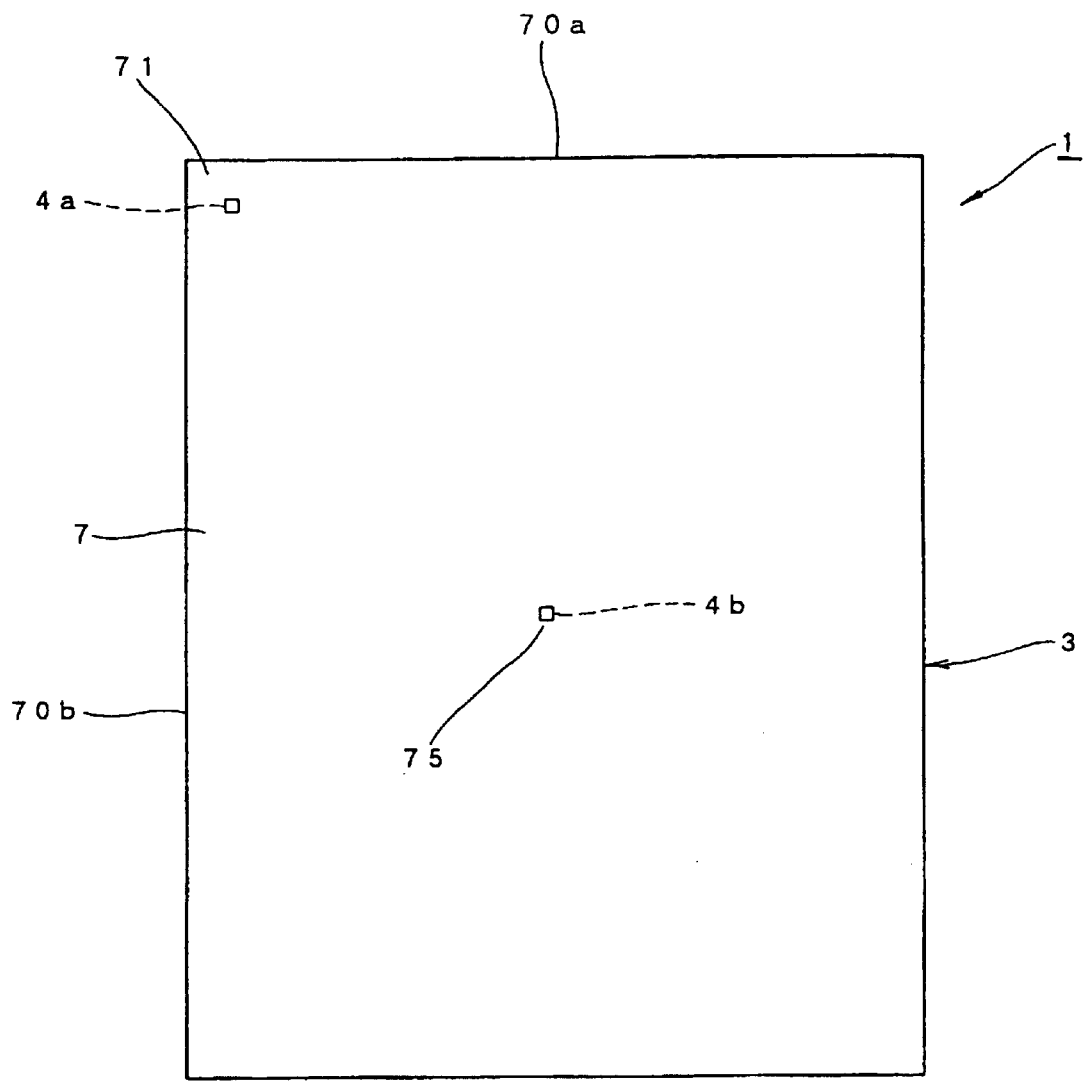
FIG. 8 is a back view showing the passport with an anti-counterfeit ID chip according to embodiment 7 of the present invention.

FIG. 8 is a back view showing the passport with the anti-counterfeit ID chip according to the seventh embodiment of the present invention.

Particle-like ID chips 4a and 4b storing the identification photograph information of the passport owner are embedded in the center area 75 and the corner area 71 where an upper rim 70a and one side rim 70b meet of the back cover 7 of the passport body 3.

Figure 9:
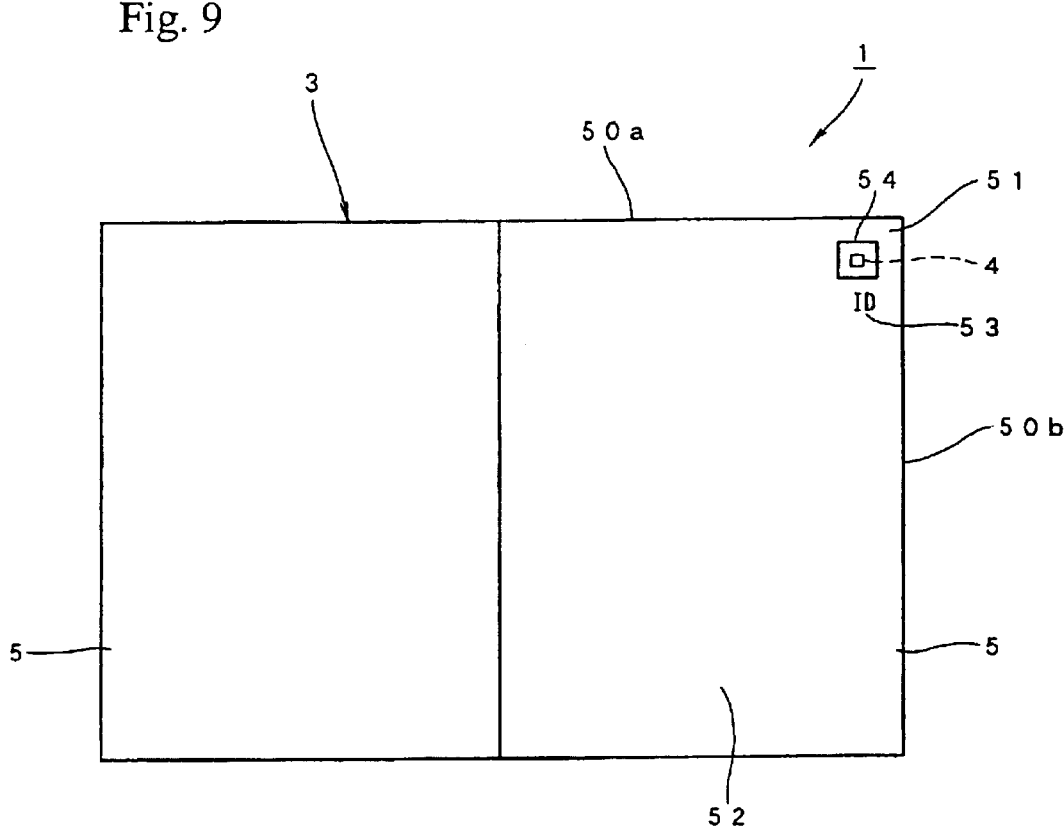
FIG. 9 is a front view showing the passport with an anti-counterfeit ID chip according to embodiment 8 of the present invention.

FIG. 9 is a front view showing the passport with an anti-counterfeit ID chip according to the eighth embodiment of the present invention in opened state.

A particle-like ID chip 4 storing the identification photograph information of the passport owner is embedded in the corner area 51 where the upper rim 50a and one side rim 50b meet on an appropriate sheet of paper 5 disposed between the front cover 6 and the back cover 7 of the passport body 3.

As shown in FIG. 9, on one side 52 of the appropriate sheet of paper 5 disposed between the front and back covers of the passport body 3 is printed a mark 53 indicating that an ID chip 4 is mounted therein.

Moreover, on the surface 52 of the appropriate sheet of paper 5 disposed between the front and back covers 6, 7 is printed a mark indicating where the ID chip 4 is embedded.

Figure 10:
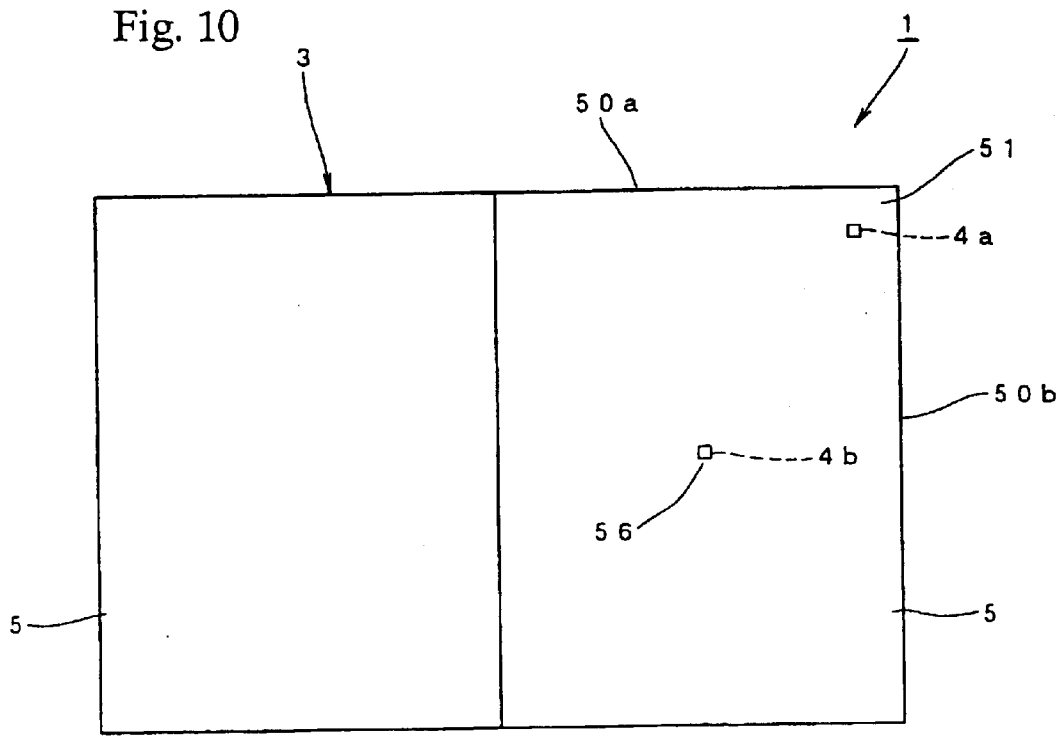
FIG. 10 is a front view showing the passport with an anti-counterfeit ID chip according to embodiment 9 of the present invention in opened state.

FIG. 10 is a front view showing the passport with an anti-counterfeit ID chip according to the ninth embodiment of the present invention in opened state.

As shown in FIG. 10, particle-like micro ID chips 4a and 4b storing identification photograph information of the passport owner are embedded in the center area 56 and the corner area 51 where an upper rim 50a and one side rim 50b meet on an appropriate sheet of paper 5 disposed between the front cover 6 and the back cover 7 of the passport body 3.

As explained, the passport with an anti-counterfeit ID chip according to the present invention comprises a particle-like micro ID chip embedded in a passport, the ID chip being capable of storing at least an identification photograph information of the passport owner that can be compared with the identification photograph printed on the passport. The ID chip being embedded in the passport will not break even when the passport is bent, and the ID chip comprises a large capacity of memory, allowing various passport ID information other than the identification photograph information of the passport owner to be stored therein. By simply embedding the ID chip in the passport, forging of the passport can be prevented effectively. The present passport with an anti-counterfeit ID chip can be manufactured easily, and can be produced in large quantities. Since the particle-like micro ID chip of the present invention is smaller than a rice grain, there is no need to provide a special space in the passport for embedding the chip. The identification photograph information recorded in the ID chip can be read using a dedicated ID chip reader and displayed on a screen for the officer at the embarkation/disembarkation check gate to visually observe and compare the identification photograph printed on the passport with the identification photograph information stored in the ID chip, in order to confirm whether the passport owner and the passport holder are actually the same person, and to judge whether the passport is counterfeited or not. According to the present passport with an anti-counterfeit ID chip, officers at the airport check gate can check with high accuracy whether a passport is counterfeited or not, and so the officers can clamp down on illegal entry or illegal departure at the airport check gate.

According to the present passport with an anti-counterfeit ID chip, the ID chip is embedded in the sheet of paper constituting the page on which the identification photograph of the passport owner is printed in the passport body, so it is possible for the officer at the check gate to visually compare the identification photograph printed on the passport body with the identification photograph information read from the ID chip and displayed on the screen by simply opening the passport to the page with the photograph.

According to another aspect of the present passport with an anti-counterfeit ID chip, the ID chip is embedded in an appropriate location on the sheet of paper constituting the page on which the identification photograph of the passport owner is printed in the passport body, so the ID chip can be selectively located to the most appropriate position within the page having the identification photograph in the passport body.

According to another aspect of the present passport with an anti-counterfeit ID chip, the ID chip is embedded in the photograph surface of the page on which the identification photograph of the passport owner is printed in the passport body, so the ID chip can be selectively disposed at the most appropriate position on the photograph surface of the page with the identification photograph in the passport body.

According to yet another aspect of the present passport with an anti-counterfeit ID chip, the ID chip is embedded in the front or back cover or any appropriate sheet of paper of the page other than the page on which the identification photograph of the passport owner is printed in the passport body, so the ID chip can be selectively disposed at any appropriate position on the front or back cover or any appropriate sheet of paper of the passport body according to need.

According to still another aspect of the present passport with an anti-counterfeit ID chip, the number of ID chips embedded in the passport body is one or more than one, so the number of ID chips disposed in the passport body can be selected optionally according to need.

What is claimed is:

1. A passport with an anti-counterfeit ID chip for certifying an identity and nationality of a passport holder entering and departing a foreign country, having an identification photograph printed thereto for confirming the passport owner, the passport comprising:

a passport body; and a particle-like micro ID chip embedded in the passport body storing at least an identification photograph information comparable with said identification photograph printed on the passport body, wherein said ID chip is embedded in the photograph surface in a sheet of paper constituting a page on which said identification photograph of the passport owner is printed in the passport body.

2. A passport with an anti-counterfeit ID chip according to claim 1, wherein the number of said ID chips embedded in the passport body is one or more than one.

* * * * *